(12) United States Patent
Hartwich et al.

(10) Patent No.: US 9,985,798 B2
(45) Date of Patent: *May 29, 2018

(54) METHOD AND SUBSCRIBER STATION FOR OPTIMIZED DATA TRANSMISSION BETWEEN SUBSCRIBER STATIONS IN A BUS SYSTEM

(75) Inventors: Florian Hartwich, Reutlingen (DE); Reiner Schnitzer, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1192 days.

This patent is subject to a terminal disclaimer.

(21) Appl. No.: 13/825,854

(22) PCT Filed: Sep. 21, 2011

(86) PCT No.: PCT/EP2011/066430
§ 371 (c)(1),
(2), (4) Date: Oct. 7, 2013

(87) PCT Pub. No.: WO2012/038472
PCT Pub. Date: Mar. 29, 2012

(65) Prior Publication Data
US 2014/0023089 A1    Jan. 23, 2014

(30) Foreign Application Priority Data
Sep. 24, 2010   (DE) .................. 10 2010 041 368

(51) Int. Cl.
*H04L 12/40*   (2006.01)
*H04L 12/413*   (2006.01)

(52) U.S. Cl.
CPC .... *H04L 12/4013* (2013.01); *H04L 12/40169* (2013.01); *G05B 2219/25031* (2013.01);
(Continued)

(58) Field of Classification Search
CPC .......... H04L 12/4013; H04L 12/40169; H04L 2012/40215; H04L 12/4135;
(Continued)

(56) References Cited

U.S. PATENT DOCUMENTS 4,402,090 A   8/1983  Gfeller et al.
4,477,898 A   10/1984  Cholat-Namy
(Continued)

FOREIGN PATENT DOCUMENTS

CN   1692034 A   11/2005
CN   101099360 A   1/2008
(Continued)

OTHER PUBLICATIONS

AN228, titled "A CAN Physical Layer Discussion" (AN228 hereinafter) was published as Application Notes by Microchip Technology Inc., in 2002, pp. 01 through 12.*

(Continued)

*Primary Examiner* — Andrew Lai
*Assistant Examiner* — Hoyet H Andrews, III
(74) *Attorney, Agent, or Firm* — Norton Rose Fulbright US LLP; Gerard Messina

(57) ABSTRACT

A method for transmitting first and second data between subscriber stations of a bus system via a first channel jointly used by a plurality of subscriber stations and via a second channel of the bus system, used in addition to the first channel by a plurality of subscriber stations, the first channel using the access method and transmission protocol of the CAN specification or the extension thereof, the TTCAN specification, the access to the second channel being controlled according to an arbitrary access method, and first data to be transmitted via the first channel and second data to be transmitted via the second channel being transmitted via a joint signal line, and a data signal being formed as a function (Continued)

of the first data, and a modulation signal being formed as a function of the first and second data, and the modulation signal being superposed on the data signal.

19 Claims, 5 Drawing Sheets

(52) U.S. Cl.
CPC ............... *G05B 2219/25032* (2013.01); *H04L 12/4135* (2013.01); *H04L 2012/40215* (2013.01); *H04L 2012/40273* (2013.01)

(58) Field of Classification Search
CPC ........... H04L 2012/40273; G05B 2219/25031; G05B 2219/25032
See application file for complete search history.

(56) References Cited

U.S. PATENT DOCUMENTS

| | | | | |
|---|---|---|---|---|
| 5,479,395 | A * | 12/1995 | Goodman | H04L 12/40032 370/438 |
| 6,708,239 | B1 * | 3/2004 | Ellerbrock | H04L 12/40032 710/62 |
| 7,209,488 | B2 * | 4/2007 | Becker | H04L 12/4013 370/406 |
| 8,023,585 | B2 * | 9/2011 | Majima | H04L 1/0014 375/295 |
| 8,295,400 | B2 * | 10/2012 | Nakao | H04B 7/0697 375/299 |
| 8,553,791 | B1 * | 10/2013 | McCloskey | H04K 1/10 375/130 |
| 2003/0035365 | A1 * | 2/2003 | Jurdi | H04L 12/5601 370/201 |
| 2003/0076221 | A1 | 4/2003 | Akiyama et al. | |
| 2003/0081582 | A1 * | 5/2003 | Jain | H04B 7/18582 370/338 |
| 2004/0199691 | A1 * | 10/2004 | Ellerbrock | H04L 12/403 710/112 |
| 2004/0203383 | A1 * | 10/2004 | Kelton | H04L 1/02 455/41.2 |
| 2004/0205111 | A1 * | 10/2004 | Chasmawala | H04L 12/40 709/201 |
| 2005/0030970 | A1 * | 2/2005 | Britton | H04W 74/0841 370/462 |
| 2005/0083889 | A1 * | 4/2005 | Enders | H04L 41/145 370/332 |
| 2005/0163071 | A1 * | 7/2005 | Malladi | H04J 13/00 370/328 |
| 2005/0206240 | A1 * | 9/2005 | Enders | B60R 16/0315 307/10.1 |
| 2006/0271694 | A1 * | 11/2006 | Matsuo | H04L 12/4135 709/229 |
| 2007/0067518 | A1 * | 3/2007 | Nichols | H04J 3/0641 710/100 |
| 2007/0288645 | A1 * | 12/2007 | Kass | H04L 63/0281 709/230 |
| 2010/0088537 | A1 * | 4/2010 | Hua | H04L 12/4135 713/600 |
| 2012/0189021 | A1 * | 7/2012 | Hartwich | H04L 12/413 370/438 |

FOREIGN PATENT DOCUMENTS

| | | | |
|---|---|---|---|
| CN | 101529820 A | 9/2009 | |
| DE | 100 00 305 | 7/2001 | |
| DE | 103 01 637 | 7/2004 | |
| DE | 10301637 A1 * | 7/2004 | ......... B60R 16/0315 |
| DE | 10 2009 026 961 | 12/2010 | |
| JP | 2003-318925 | 11/2003 | |
| WO | 2004/111859 | 12/2004 | |

OTHER PUBLICATIONS

Thomas Fuehrer et al titled "Time Triggered CAN (TTCAN)," (Fuehrer hereinafter) was published as In-Vehicle Networks 2001 (SP-1594), SAE 2001 World Congress, Detroit, Michigan Mar. 5-8, 2001, pp. 01 through 07.*

Pat Richards, titled "Understanding Microchip's CAN Module Bit Timing" (Richards hereinafter) was published as Application Notes by Microchip Technology Inc., in 2001, pp. 01 through 12.*

* cited by examiner

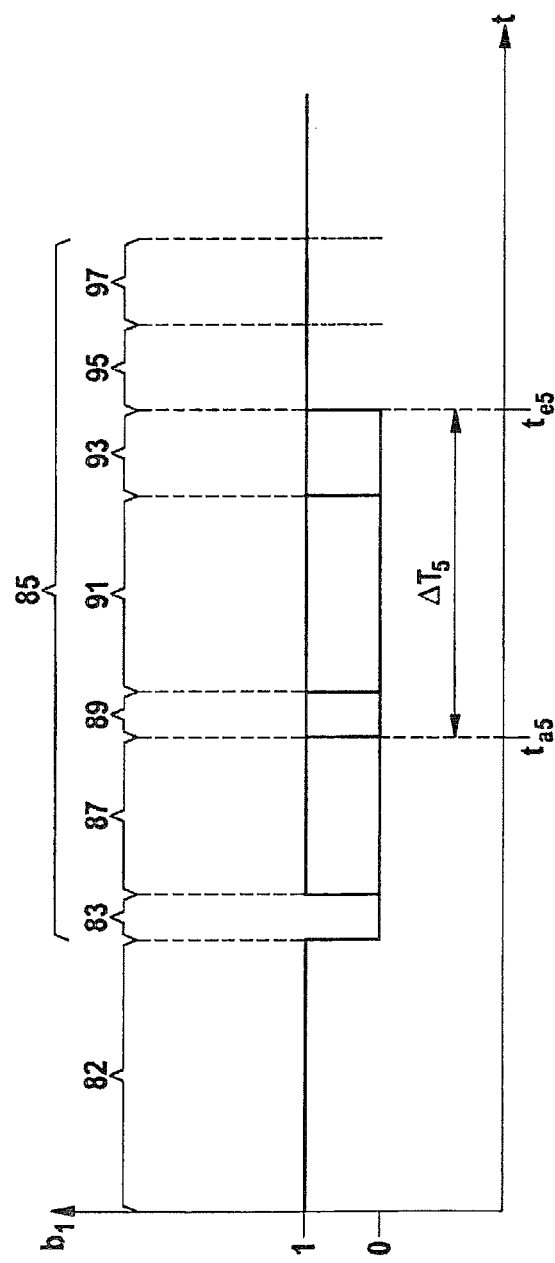

001# METHOD AND SUBSCRIBER STATION FOR OPTIMIZED DATA TRANSMISSION BETWEEN SUBSCRIBER STATIONS IN A BUS SYSTEM

FIELD OF THE INVENTION

The present invention relates to a method for transmitting data between subscriber stations of a bus system via a first channel jointly used by a plurality of subscriber stations and a second channel used by a plurality of subscriber stations of the bus system, the signal transmitted on the second channel also being a function of the data transmitted on the first channel. Moreover, the present invention relates to a subscriber station of a bus system having a media connection unit for carrying out the method.

BACKGROUND INFORMATION

The controller area network (CAN), and an extension of the CAN known as a Time Triggered CAN (TTCAN), are discussed for example in laid open print DE 100 00 305 A1.

The media access control method used in the CAN is based on a bitwise arbitration. In the bitwise arbitration, a plurality of subscriber stations can simultaneously attempt to transmit data via the channel of the bus system without thereby disturbing the data transmission. During the transmission of a bit via the channel, the subscriber stations can determine the logical state (0 or 1) of the channel. If a value of the sent bit does not correspond to the determined logical state of the channel, the subscriber station then terminates the access to the channel. In CAN, the bitwise arbitration is standardly carried out in an arbitration field within a data frame that is to be transmitted via the channel. After a subscriber station has completely sent the arbitration field on the channel, the station knows that it has exclusive access to the channel. Thus, the end of the transmission of the arbitration field corresponds to a beginning of an enable interval within which the subscriber station can make exclusive use of the channel. According to the protocol specification of the CAN, other subscriber stations are not permitted to access the channel, i.e. send data on the channel, until the sending subscriber station has transmitted a checksum field (CRC field) of the data frame. Thus, an end time of the transmission of the CRC field corresponds to an end of the enable interval.

The bitwise arbitration achieves a non-destructive transmission of the data frame via the channel. This results in good real-time characteristics of the CAN, whereas media access control methods in which the data frame sent by a subscriber station can be destroyed due to a collision with further data frames sent by another station during the transmission via the channel have a significantly less favorable real-time characteristic, because, due to the collision and the new transmission of the data frame that is thus required, there is a delay of the data transmission.

A further improvement of the real-time behavior of the CAN is achieved through the extension TTCAN. According to the TTCAN protocol specification, a time window structure is defined that includes a plurality of successive time windows (often also called time slots) and that repeats regularly. Here, a particular message type, and thus a particular subscriber station, can have assigned to it a particular time window within which messages of this message type may be transmitted. Thus, in TTCAN particular time windows are provided within which a particular station has exclusive access to the channel of a CAN domain. In TTCAN, the access to the channel is coordinated at least partly according to the time-based multiple access design (Time Division Multiple Access, or TDMA).

The CAN protocols, or the protocols of its extension TTCAN, are suitable in particular for transmitting short messages under real-time conditions. If, however, larger data blocks are to be transmitted via a CAN domain, then the relatively low bit rate of the channel may be noticeable in a disturbing manner. In order to ensure the correct functioning of the bitwise arbitration, for the transmission of a bit a least duration must be adhered to that is a function in particular of the extent of the bus system and is also a function of the signal propagation speed on the channel. Thus, the bit rate cannot be easily increased by reducing the duration of the individual bits.

To make it possible to transmit relatively large data quantities with adequate speed via a communication interface parallel to a slower data stream controlled by a media access control method, such as a CAN data stream, the patent application pending with the German Patent and Trademark Office under file number DE 10 2009 026 961 provides that a radio-frequency (RF) communication be carried out via an arbitrary bus system, for example a CAN bus, with an arbitrary access protocol. Here, the access to the second channel used by a plurality of subscriber stations for the RF communication can be controlled according to an arbitrary access method. First data that are to be transmitted via the first channel, and second data that are to be transmitted via the second channel, are transmitted via a joint signal line.

SUMMARY OF THE INVENTION

An object of the exemplary embodiments and/or exemplary methods of the present invention is to provide for an improved method for access of a subscriber station of a bus system to a second channel of a bus system parallel to the first channel that is jointly used by a plurality of subscriber stations, in which mutual interferences between the channels and/or electromagnetic emissions are reduced. This object is achieved by a data transmission method having the features of Claim 1.

In the realization of the method according to the present invention as well, it is provided to carry out a radio-frequency (RF) communication via an arbitrary bus system, for example a CAN bus, using an arbitrary access protocol, the access to the second channel used by a plurality of subscriber stations for RF communication being controlled according to an arbitrary access method. First data that are to be transmitted via the first channel and second data to be transmitted via the second channel are transmitted via a joint signal line. It is conceivable that this be a bus line of a known bus system, in particular of the CAN, via which the data of the first channel are transmitted according to the CAN protocols. This has the advantage that conventional subscriber stations, which for example use the known CAN protocols, can unproblematically be connected to the bus system that is operated with the method according to the present invention. To this extent, the proposed method is an extension of the CAN protocols that is compatible with the known CAN protocols and devices.

Here, a data signal may be formed as a function of the first data, and that a modulation signal be formed as a function of the first data and of the second data, and that the modulation signal be superposed on the data signal. As a modulation method for forming the modulation signal, for example a frequency modulation can be used, in particular a frequency sampling as a function of a logical state (0 or 1) of the second channel. It is also conceivable to provide a phase modulation, for example a binary phase modulation (binary phase shift keying, BPSK).

In order that the transmission of the first data via the second channel not be disturbed by the simultaneously occurring transmission of the second data via the second channel, it particularly may be that the modulation method used, or the parameters and/or characteristic quantities thereof, be adapted as a function of the first data or of the data signal formed therefrom.

It may also be that the modulation signal be interrupted or attenuated at particular times, as a function of the first data or as a function of the data signal formed therefrom.

The subscriber station may be set up for the execution of the method according to the present invention, so that it realizes the advantages thereof.

Further features and advantages of the present invention result from the following description, in which exemplary embodiments of the present invention are explained in more detail on the basis of the drawings.

BRIEF DESCRIPTION OF THE DRAWINGS

FIG. 5 shows a time curve of the channel occupancy during the transmission of a message via the channel.

DETAILED DESCRIPTION

Figure 1:
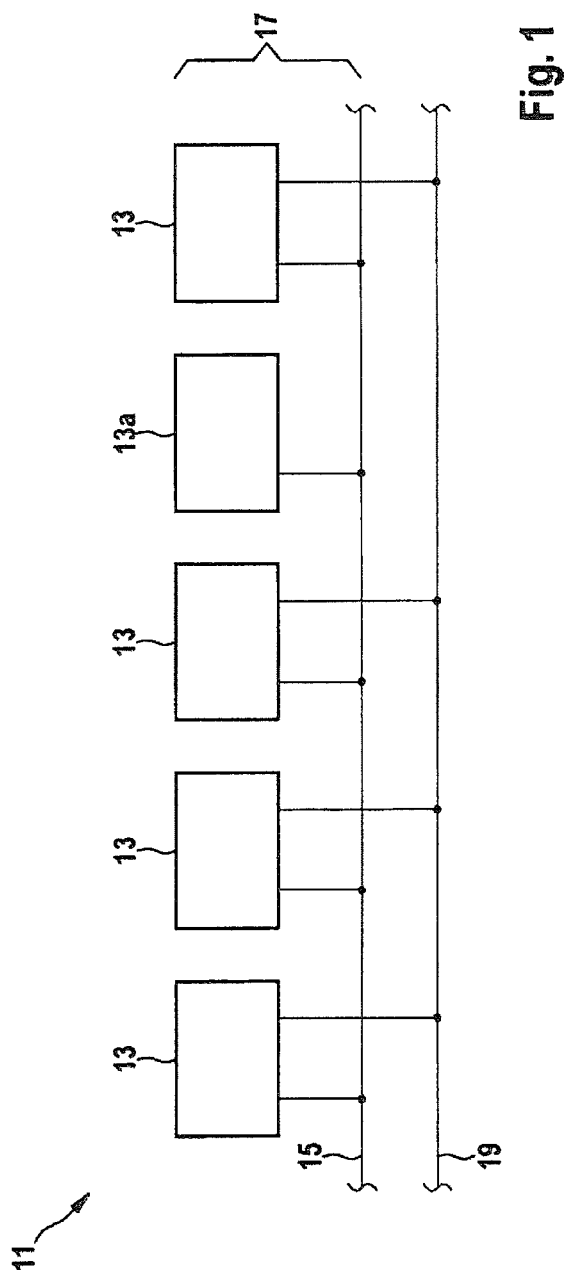
FIG. 1 shows a schematic representation of a bus system having a plurality of subscriber stations.

FIG. 1 shows an overview of a bus system 11 of a motor vehicle including a plurality of subscriber stations 13, 13a and a first channel 15 jointly used by these subscriber stations 13, 13a. In the depicted exemplary embodiments, subscriber stations 13, 13a and first channel 15 form a CAN domain 17. However, the present invention can be used not only on CAN, but also on other types of communication networks. It is advantageous, but not a necessary condition, if in the communication networks used an exclusive collision-free access of a station to a joint channel is ensured at least for particular time spans. Subscriber stations 13, 13a can for example be control devices or display devices of the motor vehicle.

A portion of subscriber stations 13 is connected to a second channel 19 that is jointly used by this portion of subscriber stations 13. In the depicted exemplary embodiment, all subscriber stations 13 except for subscriber station 13a are connected to the two channels 15, 19. Subscriber station 13a is a conventional subscriber station 13a that uses the CAN protocols but is not set up to execute a method according to the present invention. The other subscriber stations 13 are expanded according to the present invention to include additional functions so that they can additionally communicate via second channel 19. In the bus system 11 shown in FIG. 1, conventional subscriber stations 13a and expanded subscriber stations 13 can thus be connected to one another. A plurality of conventional subscriber stations 13a can also be provided in the bus system; however, it is also conceivable to provide in bus system 11 only expanded subscriber stations 13 that are connected to both channels 15, 19.

In the following, the exemplary embodiments and/or exemplary methods of the present invention are explained on the basis of a media access control method or protocol used in the CAN bus. Of course, the exemplary embodiments and/or exemplary methods of the present invention are however not limited to such access methods, but rather can be used with arbitrary media access control methods and protocols.

Figure 2:
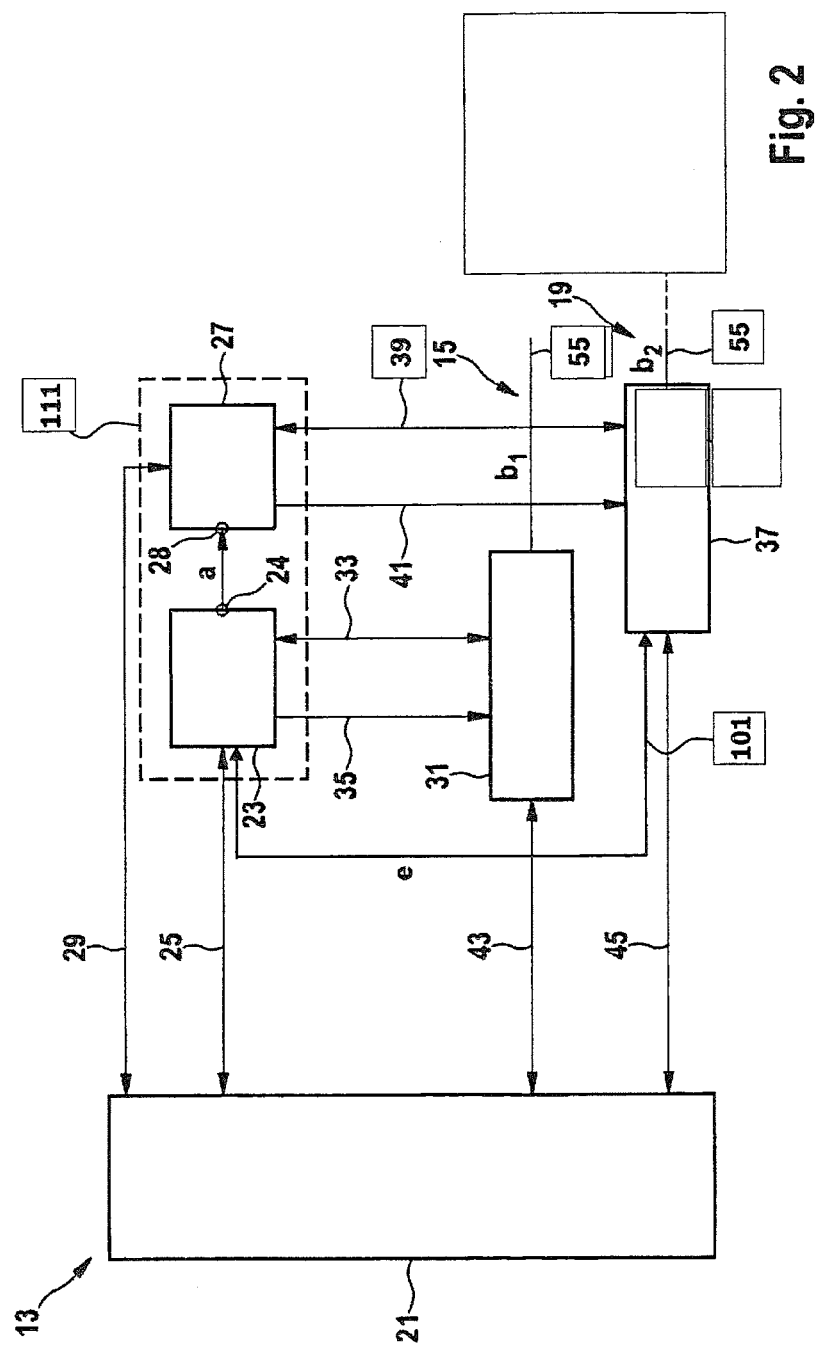
FIG. 2 shows a schematic representation of the relevant parts of one of the subscriber stations of FIG. 1.

FIG. 2 shows an expanded subscriber station 13 in detail. This subscriber station 13 has a microcomputer 21 that can be fashioned for example as a microcontroller. A first control element of the subscriber station, in the form of a CAN controller 23, is connected to microcomputer 21 via a first connection 25. In addition, subscriber station 13 has a second control element in the form of a communication controller 27 that is connected to microcomputer 21 via a second connection 29. The two connections 25, 29 are set up for the exchange of data that is to be transmitted via bus system 11, as well as configuration, control, and status information, between microcomputer 21 and the two control elements 23, 27. Communication controller 27 is coupled to CAN controller 23 in such a way that the CAN controller can control communication controller 27 using an access control signal a that it produces. For this purpose, a control input 28 of communication controller 27 is connected to a control output 24 of CAN controller 23.

In addition, subscriber station 13 has a first media connection unit that is fashioned as a CAN transceiver 31. CAN transceiver 31 is connected to CAN controller 23 in such a way that first data that are to be transmitted via CAN domain 17, i.e. first channel 15, can be exchanged between CAN controller 23 and CAN transceiver 31 (arrow 33). In addition, CAN transceiver 31 is connected to CAN controller 23 in such a way that CAN controller 23 can transmit control signals to CAN transceiver 31 (arrow 35). CAN transceiver 31 is connected to first channel 15.

In addition, subscriber station 13 has a second media connection unit 37 that is connected to communication controller 27 for the transmission of data that are to be transmitted via second channel 19 (arrow 39) and for the transmission of control signals (arrow 41) between communication controller 27 and second media connection unit 37. Second media connection unit 37 is connected to second channel 19. Media connection unit 37 is coupled to CAN controller 23 in such a way that CAN controller 23 can use a property control signal e that it produces to influence the properties of media connection unit 37. For this purpose, a control input of media connection unit 37 is connected to a control output of CAN controller 23 via control line 101.

Another variant that is merely suggested in FIG. 2 would be to combine the functions of CAN controller 23 and of the further communication controller 27 in an expanded CAN controller 111. In this case, control input 28 and control output 24 would be omitted, and the access control would take place not via a corresponding signal a but rather through internal controlling or adaptation of the processes running in expanded CAN controller 111. Property control signal e could if warranted be transmitted via connections 39 and 41, and control line 101 provided separately for this purpose could be omitted.

In addition, the two media connection units 31, 37 can be connected to microcomputer 21 so that microcomputer 21 can control the two media connection units 31, 37 and can read out status information from the two media connection units 31, 37 (see arrows 43 and 45). Such a connection of microcomputer 21 to media connection units 31, 37 is however optional, and the present invention can also be realized without such a connection.

There is a high degree of freedom in the precise realization of communication controller 27 and second media connection unit 37. It is necessary only that communication controller 27 and second media connection unit 37 provide a transmission device for transmitting second data between expanded subscriber stations 13. A protocol for controlling media access to the second channel (media access control protocol, or MAC protocol) need not be realized via second channel 19. A transceiver for the FlexRay communication system or for local computer networks such as Ethernet can for example be used as second media connection unit 37. In this way, a bit rate of 10 MB per second or 100 MB per second can for example be realized on second channel 19.

If access control signal a is active, i.e. access to second channel 19 is enabled, then in the case of the specific embodiment shown in FIG. 2, in sending subscriber station 13 second media connection unit 37 outputs second bitstream or data stream $b_2$ to signal line 55. In the receiving subscriber stations 13, second media connection unit 37 demodulates the modulated signal outputted by sending subscriber station 13, and in this way reconstructs the sent bitstream or data stream $b_2$, and passes the contained second data to communication controller 27.

In the exemplary embodiment shown in FIG. 2, first channel 15 and second channel 19 use a joint signal line 55 for the transmission of the data, and for this purpose media connection unit 37 includes a coupling device (not shown in more detail) for coupling in the signals onto joint signal line 55. The influencing according to the present invention of the characteristic of media connection unit 37 takes place via a property control signal e on a control line 101 between CAN controller 23 and media connection unit 37. This can for example be distinguished in that as property control signal e the logical state of the RxD input of CAN controller 23 is communicated to media connection unit 37, and as a function of the logical state (1 or 0) of the communication on first channel 15 media connection unit 37 drives the bus level of signal line 55 with different properties for the communication on second channel 19. If a logical 0 is transmitted on first channel 15, then according to the CAN protocol a dominant bus level is set having a different voltage between the two lines of nominally 2 V. If a 1 is transmitted, then the recessive bus level results via the terminating resistors, with a difference voltage of 0 V. Media connection unit 37 takes into account the different attenuation characteristics or the changing impedance of the bus system in these two states, and optimizes the bitstream or data stream $b_2$ transmitted on second channel 19 in such a way that interferences of the communication on first channel 15, as well as electromagnetic emissions, are minimized.

For example, the current strength set by media connection unit 37 for producing the bitstream or data stream $b_2$ can be controlled as a function of the bus impedance, in the form that voltage accesses are avoided when there is changing, in particular rapidly climbing, bus impedance. In this way, for example electromagnetic emissions can be reduced.

Alternatively, a changeover or adaptation of media connection unit 37 via communication line 45 can be controlled by microcomputer 21.

Figure 3:
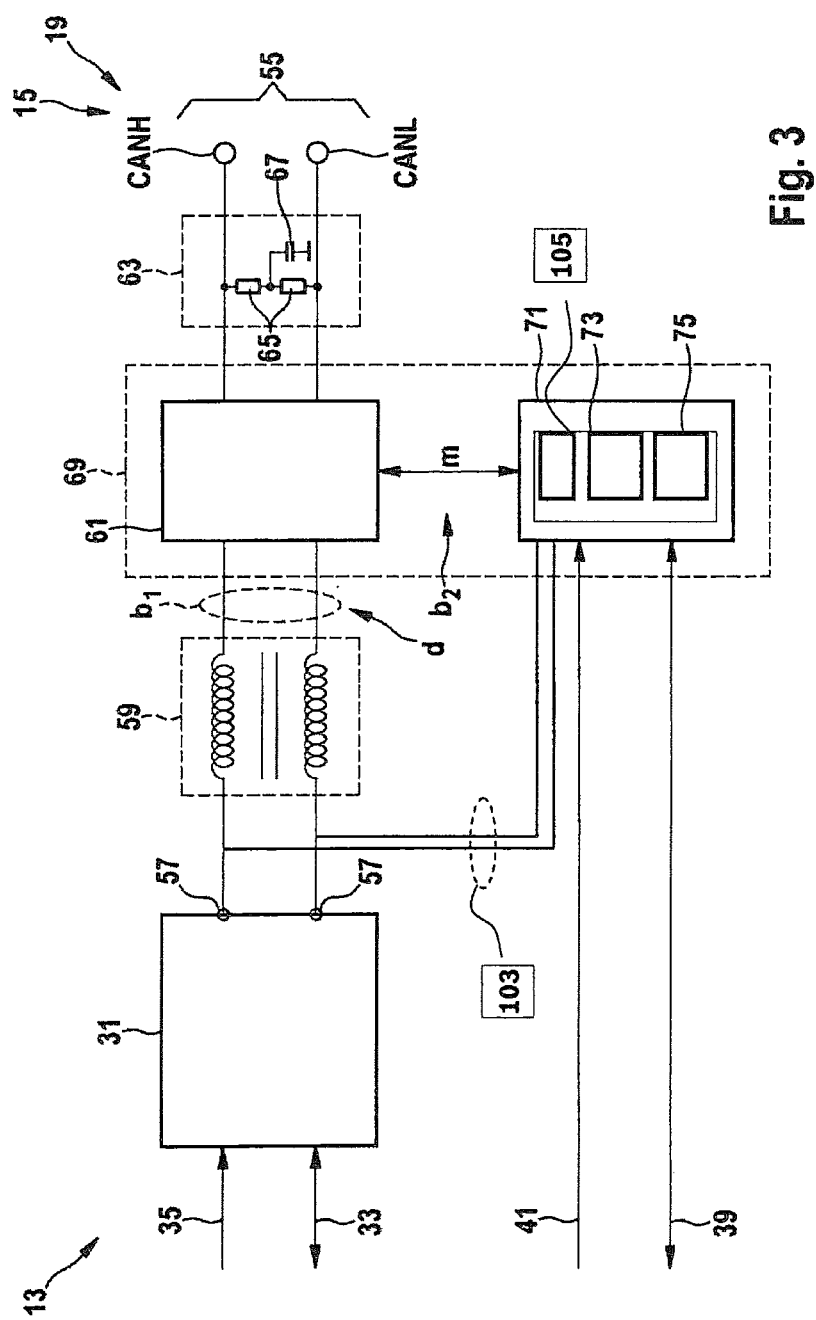
FIG. 3 shows a schematic representation of a part of a subscriber station from FIG. 1, according to a specific embodiment of the present invention.

FIG. 3 shows a further specific embodiment of the present invention in which a joint signal line 55 is again provided for the two channels 15, 19. In this example, joint signal line 55 includes a conductor pair made up of a first conductor CANH and a second conductor CANL. In the depicted specific embodiment, joint signal line 55 is a conventional bus line suitable for a bus system based on CAN.

As can be seen from FIG. 3, CAN transceiver 31 is also present in a subscriber station 13 that is configured for connection to joint signal line 55. This CAN transceiver is connected to CAN controller 23 via lines 33, 35. A common mode choke 59 is situated on two bus terminals 57 of the CAN transceiver 31. Between common mode choke 59 and conductor pair CANH, CANL of joint signal line 55 there is situated a coupling element 61. Coupling element 61 can also be combined with common mode choke 59 in order to make it possible to inductively couple the radio-frequency signals in or out, and to galvanically decouple the radio-frequency part of subscriber 13 from CAN bus 55. Moreover, between first conductor CANH and second conductor CANL there is situated a bus terminating circuit 63 that has two terminating resistors 65 connected in series, the outer ends of this series circuit being connected to conductors CANH, CANL and a center tap of this series circuit being connected to ground via a capacitor 67. In a specific embodiment that is not depicted, common mode choke 59 and/or bus terminating circuit 63 are not provided.

Coupling element 61 is part of a connection circuit 69 of subscriber station 13 which, in the specific embodiment shown in FIG. 3, is provided instead of second media connection unit 37. A modem 71 of connection circuit 69 can be connected on the one hand to microcomputer 21 and is connected on the other hand to coupling element 61. Modem 71 has a modulator 73 for producing a signal m that is modulated as a function of second bitstream or data stream $b_2$. In addition, modem 71 has a demodulator 75 for demodulating modulated signal m sent by another subscriber station 13 via joint signal line 55. In addition, modem 71 is connected to bus terminals 57 of CAN transceiver 31 via a signal connection 103, and has a matching unit 105 that is set up to adapt one or more properties of the modem as a function of information determined for example via signal connection 103, via first data channel 15 or via bitstream $b_1$ transmitted on this first channel 15.

In this example, modem 71 can determine or sample the line level of the two bus lines (CANH, CANL) via the connections 103 provided for this purpose. For this purpose, in this example matching unit 105 in modem 71 contains a comparator circuit. The sampling can be carried out at various places between bus terminals 57 of CAN transceiver 31 and the terminals on conductors CANH, CANL. In order to avoid feedback effects of the signal sent on second channel 19 on the signal sampled via connection 103, it is advantageous to carry out the sampling between the common mode choke 59 that may be present and terminals 57. In the depicted example, the sampling takes place directly before terminals 57. The modem can then for example be characterized in that modulation signal m that is produced from the data provided by communication controller 27 for transmission on second channel 19 is interrupted or attenuated at particular times as a function of first data $b_1$ or of data signal d formed therefrom or of the determined line level of the two bus lines (CANH, CANL).

It would also be possible to provide in modem 71 a logic unit that, when an interference of second channel 19 is recognized, in particular a scattering in of signals in the same frequency range due to the antenna function of signal line 55, interrupts modulation signal m and resumes the communication via second channel 19, or the sending of modulation signal m, only after the interference has died away. For this purpose, it would be advantageous to carry out the sampling between common mode choke 59 that may be present and the terminals on conductors CANH, CANL.

In the specific embodiment shown in FIG. 3, modulator 73 of modem 71 of sending subscriber station 13 produces modulated signal m as a function of second data $b_2$ that communication controller 27 has transmitted to connection circuit 69. Coupling element 61 superposes signal m, which is modulated as a function of a second bitstream or data stream $b_2$, on a data signal d produced by CAN transceiver 31 as a function of first bitstream $b_1$. Here, in order to produce the modulated signal m modulator 73 uses information concerning data signal d or first bitstream $b_1$. For this purpose, modulator 73 is connected via connection 103 to bus terminals 57 of CAN transceiver 31, and evaluates these via a comparator circuit contained in matching unit 105. Modulation signal m influenced in this way by data signal d is outputted by coupling element 61 to the two conductors CANH and CANL of joint signal line 55 as a superposition to data signal d. At receiving subscriber stations 13, coupling element 61 forwards a signal received via the two conductors CANH and CANL via the optionally present common mode choke 59 to CAN transceiver 31, and supplies it to demodulator 75 of modem 71. From the received signal, CAN transceiver 31 extracts first bitstream $b_1$ and forwards it to CAN controller 23. Correspondingly, demodulator 75 determines second bitstream or data stream $b_2$ from the received signal. Due to the fact that the optionally present common mode choke 59 is situated between CAN transceiver 31 and coupling element 61, it is avoided that common mode choke 59 attenuates modulated signal m within a signal path between modem 71 and two subscriber stations 13 connected to joint signal line 55.

In the depicted specific embodiment, modem 71 uses as modulation method a frequency sampling as a function of the value of the individual temporally successive bits of second bitstream $b_2$. The number of bits transmitted per time is of course a function of the frequencies selected for this method. Here, the transmission can be carried out independent of the bit limits of first bitstream $b_1$, but it can also run synchronized with the bit limits, as explained below. The amplitude of modulation signal m must be selected such that on the one hand it is above the noise level of the transmission medium used or of signal line 55, but on the other hand is low enough that CAN transceiver 31 does not interpret the arriving signals, possibly attenuated by common mode choke 59, as edges or as a change between the two possible CAN bus levels.

Differing from this, instead of the frequency sampling a phase modulation or any other modulation method may also be used, for example a multi-carrier modulation such as OFDM (Orthogonal Frequency Division Multiplex), which uses a plurality of orthogonal carrier signals for the transmission.

In the simplest case, coupling element 61 can be fashioned as a resistance network. However, it can also be provided that coupling element 61 has one or more filters for separating data signal d, to be supplied to the CAN transceiver, from modulated signal m. In addition, it would be conceivable for coupling element 61 to be combined with common mode choke 59, i.e. instead of a simple inductance having four terminals to use an inductance having six or more terminals for common mode choke 59. In this way, the RF signal can be inductively coupled in or out, and the RF part is galvanically decoupled from the CAN bus. This also results in cost advantages.

In order to minimize the interferences in the communication on first channel 15, it can be particularly advantageous to shut down, attenuate, or interrupt modulation signal m sent via second channel 19 at each point in time at the boundary between two bits of bitstream $b_1$ at which edges of the bus level are expected. This can take place either at all bit limits or only for the case in which an edge, i.e. a change from dominant to recessive or from recessive to dominant bus level, will actually take place. If the modulation method discussed above using frequency sampling is used, then, as a function of the frequencies selected for the method, in this way one or more additional bits can be inserted between the limits of a transmitted bit of first bitstream $b_1$. Here as well, the amplitude of modulation signal m is to be selected such that it lies above the noise level of the transmission medium used, or of signal line 55, but is not seen by CAN transceiver 31 as an edge or as a change of the bus level.

Through a logic unit contained in provided matching unit 105, or provided separately therefrom, modem 71 can be set up so as to automatically synchronize itself to the bus clock of serial bitstream $b_1$ transmitted via first channel 15 on signal line 55, and can then carry out the corresponding matching, attenuation, or interruption of modulation signal m at the bit limits.

Figure 4:
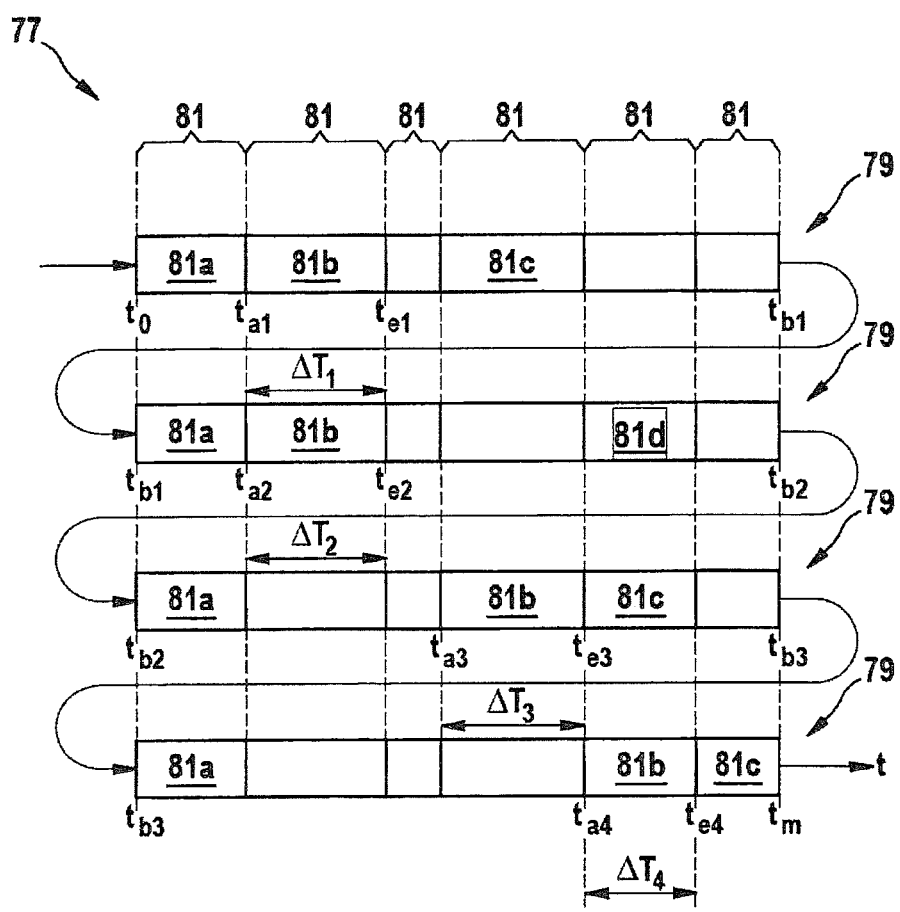
FIG. 4 shows an example of a time curve of the occupancy of a channel of the bus system.

The functioning of subscriber stations 13 and of bus system 11 in a further exemplary embodiment is now explained in more detail on the basis of FIGS. 4 and 5. During operation of bus system 11, microcomputers 21 of individual subscriber stations 13 control individual CAN controllers 23 and CAN transceivers 31 in such a way that messages can be exchanged between subscriber stations 13, 13a in accordance with the CAN protocols, by transmitting frames containing the messages via first channel 15.

In the depicted specific embodiment, individual subscriber stations 13 support the extension TTCAN. According to TTCAN, time is subdivided into regularly repeating overall cycles. Such an overall cycle 77 is shown schematically in FIG. 4. Overall cycle 77 begins at time $t_0$ and ends at time $t_m$. It will be seen that overall cycle 77 is subdivided into a plurality of base cycles 79. In the depicted specific embodiment, overall cycle 77 is divided into four base cycles 79. First base cycle 79 (shown at the top in FIG. 4) begins at time $t_0$ and ends at a time $t_{b1}$. At this time $t_{b1}$ there also begins the second base cycle 79, which follows first base cycle 79, and which ends at a time $t_{b2}$. Correspondingly, the third base cycle begins at time $t_{b2}$ and ends at a time $t_{b3}$. The fourth base cycle begins at time $t_{b3}$ and ends at time $t_m$, thus terminating overall cycle 77.

Individual base cycles 79 are subdivided into a plurality (in the depicted specific embodiment, six) of time windows 81, the division of base cycles 79 into time windows 81 being identical for each base cycle 79. The overall cycles 77 define a regularly repeating time window structure that, due to the identical subdivision of individual base cycles 79 into time windows 81, has a matrix-type structure and is thus standardly referred to as a communication matrix.

A first time window 81a is provided for the transmission of reference messages via first channel 15. The reference messages are used in particular for the synchronization of individual subscriber stations 13 among one another, so that the temporal position of individual time windows 81 is at least substantially equal from the point of view of individual subscriber stations 13. A portion of time windows 81 is assigned to a particular message type, i.e. within these time windows 81 there are transmitted exclusively data frames having a particular identifier. It can for example be provided that these time windows 81, designated 81b, are reserved for the transmission of the message of the particular type. Also seen in FIG. 4 are time windows designated 81c, within which messages of any type may be transmitted, as well as time windows designated 81d, in which no communication takes place via first channel 15.

Since given the use of CAN a message of a particular type, i.e. having a particular identifier, can be produced only by a subscriber station 13, time windows 81b are assigned exclusively to this subscriber station 13. This means that at an initial time $t_{a1}$, $t_{a2}$, $t_{a3}$, or $t_{a4}$ there begins an enable interval $\Delta T_1$, $\Delta T_2$, $\Delta T_3$, or $\Delta T_4$ within which this subscriber station 13 has exclusive access to first channel 15. Enable interval $\Delta T_1$, $\Delta T_2$, $\Delta T_3$, or $\Delta T_4$ ends in each case at the end of the associated time window 81b, i.e. at time $t_{e1}$, $t_{e2}$, $t_{e3}$, or $t_{e4}$. In the depicted specific embodiment, enable interval $\Delta T_1$, $\Delta T_2$, $\Delta T_3$, or $\Delta T_4$ corresponds to the respective time window 81b of the overall cycle. However, differing from this it can also be provided that the enable interval $\Delta T_1$, $\Delta T_2$, $\Delta T_3$, or $\Delta T_4$ corresponds only to a part of the respective time window 81b. It is essential for the functioning of the method according to the present invention that the enable interval $\Delta T_1$, $\Delta T_2$, $\Delta T_3$, or $\Delta T_4$ be completely covered, in terms of time, by a time window 81b or by a plurality of immediately successive time windows 81b.

Each subscriber station 13 acquires the times $t_0$, $t_{b1}$, $t_{b2}$, or $t_{b3}$ at which the individual reference messages are received, and calculates the temporal position at least of those time windows 81 within which it wishes to access the bus. Subscriber station 13, which is responsible for sending those messages that are assigned to time window 81b, calculates the position of enable interval $\Delta T_1$, $\Delta T_2$, $\Delta T_3$, or $\Delta T_4$ shown in FIG. 4. In the depicted specific embodiment, CAN controller 23 carries out these calculations. However, it can also be provided that these calculations are carried out by microcomputer 21. CAN controller 23 produces access control signal a and supplies this signal to communication controller 27 (see FIG. 2). In addition, CAN controller 23 produces a property control signal e, and supplies this signal to media connection unit 37 via control line 101.

Access control signal a is always active within enable interval $\Delta T_1$, $\Delta T_2$, $\Delta T_3$, or $\Delta T_4$. Communication controller 27 evaluates access control signal a and accesses second channel 19 only when an access control signal a is active. If access control signal a is not active, then communication controller 27 keeps second channel 19 open so that other subscriber stations 13 can access second channel 19. Subscriber stations 13 are thus set up in such a way that CAN controller 23 controls communication controller 27 as a function of the access control method executed in the CAN domain in such a way that communication controller 27 accesses second channel 19 only when access to first channel 15 is also permitted according to the media access control method of CAN domain 17, and in such a way that, using property control signal e, CAN controller 23 adapts the properties or the characteristic of the signals transmitted on second channel 19 as a function of the data transmitted on first channel 15.

In addition, within overall cycle 77 there are provided further time windows 81c within which messages of any type may be transmitted. Within these time windows 81c, exclusive access of a particular station to the first channel is not guaranteed. Therefore, within time windows 81c a bitwise arbitration according to the CAN protocols is carried out. The bitwise arbitration is based on the idea that for the case in which a plurality of subscriber stations 13 simultaneously access first channel 15 and send bits having different values, a bit having a particular value is always received by all stations. The value of this bit is designated the "dominant bit," and in the depicted example corresponds to the value 0.

In addition, first signal line 51 is constructed such that each subscriber station 13 can receive via its CAN transceiver 31 while it is accessing first channel 15. Thus, each subscriber station 13, while accessing first channel 15 in order to send a bit, can read the momentary state of first channel 15 in order to determine whether this state corresponds to the sent bit.

FIG. 5 shows a segment of a time curve of the logical state (value 0 or 1) of first channel 15 within time window 81c. After an idle time 82 in which first channel 15 was not occupied by any subscriber station 13, a subscriber station 13 under consideration begins to send a start bit 83 of a frame 85. After transmission of start bit 83, subscriber station 13 sends an arbitration field 87 that contains in particular the identifier of the message that indicates the type of message. During the transmission of arbitration field 87, subscriber station 13 compares the logical state of first channel 15 with the respectively sent bit of arbitration field 87. If, during the transmission of arbitration field 87, subscriber station 13 determines that the acquired state of the first channel does not correspond to the sent bit, then subscriber station 13 terminates the transmission of frame 85. In this way, it is ensured that after the transmission of arbitration field 87 at a time $t_{a5}$, a subscriber station 13 has exclusive access to first channel 15. All other stations that have simultaneously accessed first channel 15 in order to transmit a frame 85 have, at time $t_{a5}$, broken off their transmission and thus their access to first channel 15. Thus, time $t_{a5}$ is the beginning of a further enable interval $\Delta T_5$. After the sending of arbitration field 87, subscriber station 13 sends a control field 89 of frame 85, a data field 91 of frame 85, and a check field 93 (so-called CRC field).

In an acknowledge field 95 following check field 93, other subscriber stations 13 transmit an acknowledge bit via first channel 15, i.e. they access first channel 15. Thus, enable interval $\Delta T_5$, within which subscriber station 13 under consideration has exclusive access to first channel 15, ends at the end of the transmission of check field 93, i.e. at a time $t_{e5}$. Acknowledge field 95 is followed by a field having stop bits 97. Differing from the depicted specific embodiment, the enable interval can also be selected to be shorter; however, it must lie within interval $\Delta T_5$ in which subscriber station 13 has exclusive access to first channel 15.

During time windows 81c, CAN controller 23 ensures that access control signal a is active only during enable interval $\Delta T_5$, so that communication controller 27 accesses second channel 19 within time windows 81c only during enable interval $\Delta T_5$.

Differing from the depicted specific embodiment, it can also be provided that CAN controller 23 outputs enable signal a for releasing access to second channel 19 only within those time windows 81 that are provided for the transmission of messages of a particular type, i.e. for example within time windows 81b. In those time windows (e.g. time windows 81c) that are used for the transmission of messages of a different type, i.e. within which the bitwise arbitration takes place, in this specific embodiment second channel 19 is not used.

In addition, within an overall cycle 77 free time windows are also possible within which no messages are transmitted via first channel 15, e.g. time window 81d in FIG. 4. In a specific embodiment not shown in more detail, it can also be provided that CAN controller 23 enables enable signal a for enabling access to second channel 19 only within such empty time windows, such as time window 81d. In this case, due to this functional relationship between the signal on second channel 19 and the signal on first channel 15, an interaction between the signals is excluded.

It is also conceivable that an access to the second channel during interval $\Delta T_5$ is enabled only when TTCAN is not available, for example due to an error in CAN domain 17. In this way, emergency operation is enabled of bus system 11, in particular of second channel 19 when TTCAN is not available, i.e. when time window structure 77 is missing.

In addition, it can be provided that the present invention is applied to a CAN domain 17 that does not support the extension TTCAN. In such a CAN domain 17, time window structure 77 is not present. Thus, a bitwise arbitration always takes place there. In such a CAN domain 17, the access to second channel 19 is enabled during enable interval $\Delta T_5$ shown in FIG. 5.

Overall, the exemplary embodiments and/or exemplary methods of the present invention provide a method and a subscriber station 13 that enable a significant increase in the usable bit rate of a bus system through the use of an additional second channel 19, so that larger data quantities can be rapidly transmitted via the bus system. Here, the properties of the data transmission on second channel 19 are adapted as a function of the data transmitted on first channel 15 in such a way that interferences of the two transmission channels among one another, and electromagnetic emissions of the bus system, are improved in comparison with the existing art.

What is claimed is:

1. A method for transmitting first data and second data between subscriber stations of a bus system via a first channel jointly used the subscriber stations and via a second channel of the bus system, used in addition to the first channel by the subscriber stations, the first channel using the access method and transmission protocol of the CAN specification or the TTCAN specification, according to ISO 11898, the method comprising:
controlling access to the second channel according to an arbitrary access process;
transmitting first data to be transmitted via the first channel and second data to be transmitted via the second channel via a joint signal line;
forming a data signal as a function of the first data;
forming a modulation signal that is modulated as a function of the second data; and
superposing the modulation signal on the data signal, wherein interference is minimized by setting an amplitude of the modulation signal above a noise level of the signal line but small enough that the modulation signal differs sufficiently from a change between possible bus levels according to a specification of the data signal.

2. The method of claim 1, wherein the modulation signal is formed as a function of the first data and of the second data so as to minimize interference to the transmission of the first data on the first channel, caused by the superposition of the data signal and the modulation signal.

3. The method of claim 1, wherein the interference is minimized by one of providing the modulation signal with regions having relatively low amplitude in time segments that are situated close to the changes of edge of the data signal and interrupting the modulation signal in these time segments.

4. The method of claim 1, wherein the access to the second channel is controlled so that the second channel is enabled only within at least one enable interval in which access to the bus for the use of the first channel is assigned exclusively to one subscriber station.

5. The method of claim 4, wherein at least one exclusively assigned time window or a part thereof within a regularly repeating TTCAN time window structure is specified as the at least one enable interval.

6. The method of claim 4, wherein at least one open time window or a part thereof within a regularly repeating TTCAN time window structure is specified as the at least one enable interval.

7. The method of claim 4, wherein a beginning of the at least one enable interval is determined by the subscriber station using bitwise arbitration of the first channel, and the end of the same enable interval is given by the time at which the subscriber station re-enables the first channel after successful arbitration of this channel.

8. A method for transmitting first data and second data between subscriber stations of a bus system via a first channel jointly used the subscriber stations and via a second channel of the bus system, used in addition to the first channel by the subscriber stations, the first channel using the access method and transmission protocol of the CAN specification or the TTCAN specification, according to ISO 11898, the method comprising:
controlling access to the second channel according to an arbitrary access process;
transmitting first data to be transmitted via the first channel and second data to be transmitted via the second channel via a joint signal line;
forming a data signal as a function of the first data;
forming a modulation signal that is modulated as a function of the second data; and
superposing the modulation signal on the data signal, wherein electromagnetic emissions that are caused by transmission of the superposed signals and on the joint signal line are minimized by controlling a strength of a current used to produce the second data, wherein a current strength is controlled as a function of attenuation characteristics of the bus system or an impedance of the bus system.

9. A method for transmitting first data and second data between subscriber stations of a bus system via a first channel jointly used the subscriber stations and via a second channel of the bus system, used in addition to the first channel by the subscriber stations, the first channel using the access method and transmission protocol of the CAN specification or the TTCAN specification, according to ISO 11898, the method comprising:
controlling access to the second channel according to an arbitrary access process;
transmitting first data to be transmitted via the first channel and second data to be transmitted via the second channel via a joint signal line;
forming a data signal as a function of the first data;
forming a modulation signal that is modulated as a function of the second data; and
superposing the modulation signal on the data signal, wherein the superposed modulation signal is formed as a function of a currently present value of the first data, or of the data signal formed therefrom, in at least two different ways.

10. The method of claim 9, wherein during the formation of the modulation signal an impedance of the bus system, which is different as a function of the currently present value of the first data or of the data signal formed therefrom, is taken into account.

11. A subscriber station of a bus system, comprising:
a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein a data signal is formed as a function of the first data, wherein a modulation signal is formed by modulation as a function of the second data, and wherein the modulation signal is superposed on the data signal, wherein a second media connection unit includes a coupling element or is connected to a coupling element through which the data signal and the modulation signal are superposed and are transmitted on the joint signal line.

12. A subscriber station of a bus system, comprising:

a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein a data signal is formed as a function of the first data, wherein a modulation signal is formed by modulation as a function of the second data, and wherein the modulation signal is superposed on the data signal, wherein a coupling element is combined with a common mode choke so that a radio-frequency signal including a superposition of the data signal and the modulation signal is capable of being inductively coupled in or out.

13. A subscriber station of a bus system, comprising:

a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein a data signal is formed as a function of the first data, wherein a modulation signal is formed by modulation as a function of the second data, and wherein the modulation signal is superposed on the data signal, wherein a second media connection unit or a coupling element included thereby or connected thereto is connected to a first control element by a control line so that a property control signal can be used to influence the modulation signal.

14. A subscriber station of a bus system, comprising:

a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein a data signal is formed as a function of the first data, wherein a modulation signal is formed by modulation as a function of the second data, and wherein the modulation signal is superposed on the data signal, wherein a second media connection unit or a coupling element included thereby or connected thereto is connected to a first media connection unit by a signal connection so that the first data and/or the data signal can be acquired and used together with the second data to create the superposed modulation signal.

15. The subscriber station of claim 14, wherein through suitable selection of a common mode choke connected between one of the first media connection unit and the second media connection unit and the coupling element, a feedback of the coupled-in modulation signal onto the first data acquired via the signal connection and/or onto the data signal is prevented.

16. A subscriber station of a bus system, comprising:

a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein a data signal is formed as a function of the first data, wherein a modulation signal is formed by modulation as a function of the second data, and wherein the modulation signal is superposed on the data signal, wherein tasks of the first hardware control element and of the second hardware control element are combined in an expanded control element, the expanded control element transmitting a property control signal for influencing the modulation signal to a second media connection unit or to a coupling element included thereby or connected thereto via one of the provided connections, so that the property control signal can be used to influence the modulation signal.

17. A subscriber station of a bus system, comprising:

a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein a data signal is formed as a function of the first data, wherein a modulation signal is formed by modulation as a function of the second data, and wherein the modulation signal is superposed on the data signal, wherein the second hardware control element is coupled to the first hardware control element so that the second hardware control element is capable of being controlled, by an access control signal produced by the first hardware control element, to enable the access to the second channel.

18. The subscriber station of claim 17, wherein the first hardware control element enables access to the second channel by the subscriber station only within the enable interval.

19. A subscriber station of a bus system, comprising:

a first hardware control element controlling an access of the subscriber station to a first channel of the bus system jointly used by a plurality of subscriber stations, the first channel using the access method and transmission protocol of the CAN specification or the TTCAN specification, according to ISO 11898;

a second hardware control element controlling an access of the subscriber station to a second channel of the bus system used by the plurality of subscriber stations according to an arbitrary access process, wherein the two control elements are connected, via media connection units, to a joint signal line so that first data that are to be transmitted via the first channel and second data that are to be transmitted via the second channel can be transmitted between different subscriber stations via the joint signal line;

wherein the subscriber station is configured for transmitting first data and second data with another subscriber station of a bus system via a first channel jointly used by the plurality of subscriber stations and via a second channel of the bus system, used in addition to the first channel by the plurality of subscriber stations, the first channel using the access method and transmission protocol of the CAN specification or the TTCAN specification, according to ISO 11898, by performing the following:

controlling access to the second channel according to an arbitrary access process;

transmitting first data to be transmitted via the first channel and second data to be transmitted via the second channel via a joint signal line;

forming a data signal as a function of the first data;

forming a modulation signal that is modulated as a function of the second data; and superposing the modulation signal on the data signal, wherein a second media connection unit includes a coupling element or is connected to a coupling element through which the data signal and the modulation signal are superposed and are transmitted on the joint signal line.

\* \* \* \* \*